United States Patent [19]
Achelpohl

[11] Patent Number: 5,437,544
[45] Date of Patent: Aug. 1, 1995

[54] FLATTENING AND REMOVING DEVICE FOR A PLASTIC TUBULAR FILM WEB PRODUCED IN A BLOWING PROCESS

[75] Inventor: Fritz Achelpohl, Lienen, Germany

[73] Assignee: Windmöller & Hölscher, Lengerich/Westf., Germany

[21] Appl. No.: 168,255

[22] Filed: Dec. 17, 1993

[30] Foreign Application Priority Data

Dec. 18, 1992 [DE] Germany .................. 42 43 106.9
Feb. 10, 1993 [DE] Germany .................. 43 03 952.9

[51] Int. Cl.⁶ ........................................... B29C 47/08
[52] U.S. Cl. ................................. 425/72.1; 264/565; 425/326.1; 425/377
[58] Field of Search ................. 156/244.13, 244.14; 425/721, 326.1, 377, 382.3; 264/565, 566

[56] References Cited

U.S. PATENT DOCUMENTS 4,676,728 6/1987 Planeta ................... 425/72.1

FOREIGN PATENT DOCUMENTS

2035584A1 3/1972 Germany .

Primary Examiner—Tim Heitbrink
Attorney, Agent, or Firm—Keck, Mahin & Cate

[57] ABSTRACT

A flattening and removing device for a plastic tubular film web produced by a stationary film blowing head in a blowing process has two deflecting rollers and two turning bars. The first deflecting roller and the squeezing roller are mounted parallel to each other between mounting plates that are rigidly connected to a turntable mounted in turning fashion in the frame floor. The second deflecting roller is connected by a support frame to a retainer having ends which are connected to gearwheels in eccentric fashion. The turning bars are each connected by support frames to gearwheels, and the center lines of all the gearwheels are aligned with each other and with an imaginary swivel axis. Thus, the diameter of the turning bars can be increased to the desired degree without impeding the passage of the flattened tubular film when the device is installed.

5 Claims, 4 Drawing Sheets

FLATTENING AND REMOVING DEVICE FOR A PLASTIC TUBULAR FILM WEB PRODUCED IN A BLOWING PROCESS

FIELD OF THE INVENTION

The invention relates to a flattening and removing device for a plastic tubular film web produced in a blowing process by a stationary film blowing head.

BACKGROUND OF THE INVENTION

In a device of this type, known from DE 20 35 584 A1, the flattening plates are secured to an auxiliary frame which is mounted for turning to a primary frame by means of a transverse element and a supporting axle. Mounted laterally in the supporting axle and swivelable are a first turning bar with its mounting and sleeve, the second deflecting roller with its mounting and sleeve, and a second turning bar with its mounting and sleeve. The deflecting rollers and turning bars are mounted in the supporting axle in reversible, turning manner. Since the turning bars must be positioned close to the vertical supporting axle and the distance of the turning bar from the supporting axle can only be modified within narrow limits, the diameter of the turning bars can also only be modified within narrow limits; thus the diameter of the turning bars cannot be increased at will, which may nonetheless be desirable. In the known device, therefore, not only is the diameter of the turning bars restricted, the turning bars are also positioned very close to the vertical axle that supports them, and this makes it difficult to guide the film webs around the turning bars when the device is installed.

SUMMARY OF THE INVENTION

The purpose of the invention therefore is to create a device of the type described in which the diameter of the turning bars can be increased at will, without impeding the passage of the flattened film tube when the device is installed.

This purpose is achieved in a device in which the first deflecting roller and the squeezing roller are accordingly mounted parallel to one another between mounting plates that are rigidly connected to a turntable mounted in turning fashion at the bottom of the frame. The second deflecting roller is linked by a support frame to a retainer having ends that are eccentrically connected to gearwheels. The turning bars are also connected by support frames to gearwheels, and the center lines of all gearwheels are aligned with each other and with an imaginary swivel axis.

A device according to the invention permits the use of turning bars of a desired diameter, without the passage of the flattened film tube being encumbered when the device is installed after the film blowing head is started up. A further advantage of the flattening and removing device according to the invention is that vibration and oscillation are avoided, inasmuch as the mounting plates for the squeezing rollers and the flattening plates that lie adjacent to these mounting plates are no longer suspended in freely vibrating fashion, but are rigidly connected by struts to a turntable mounted in turning fashion in the frame floor.

BRIEF DESCRIPTION OF THE DRAWINGS

Further details and advantages of the invention will be apparent from the embodiment depicted in the Figures.

DETAILED DESCRIPTION OF THE PREFERRED EMBODIMENTS

Figure 1:
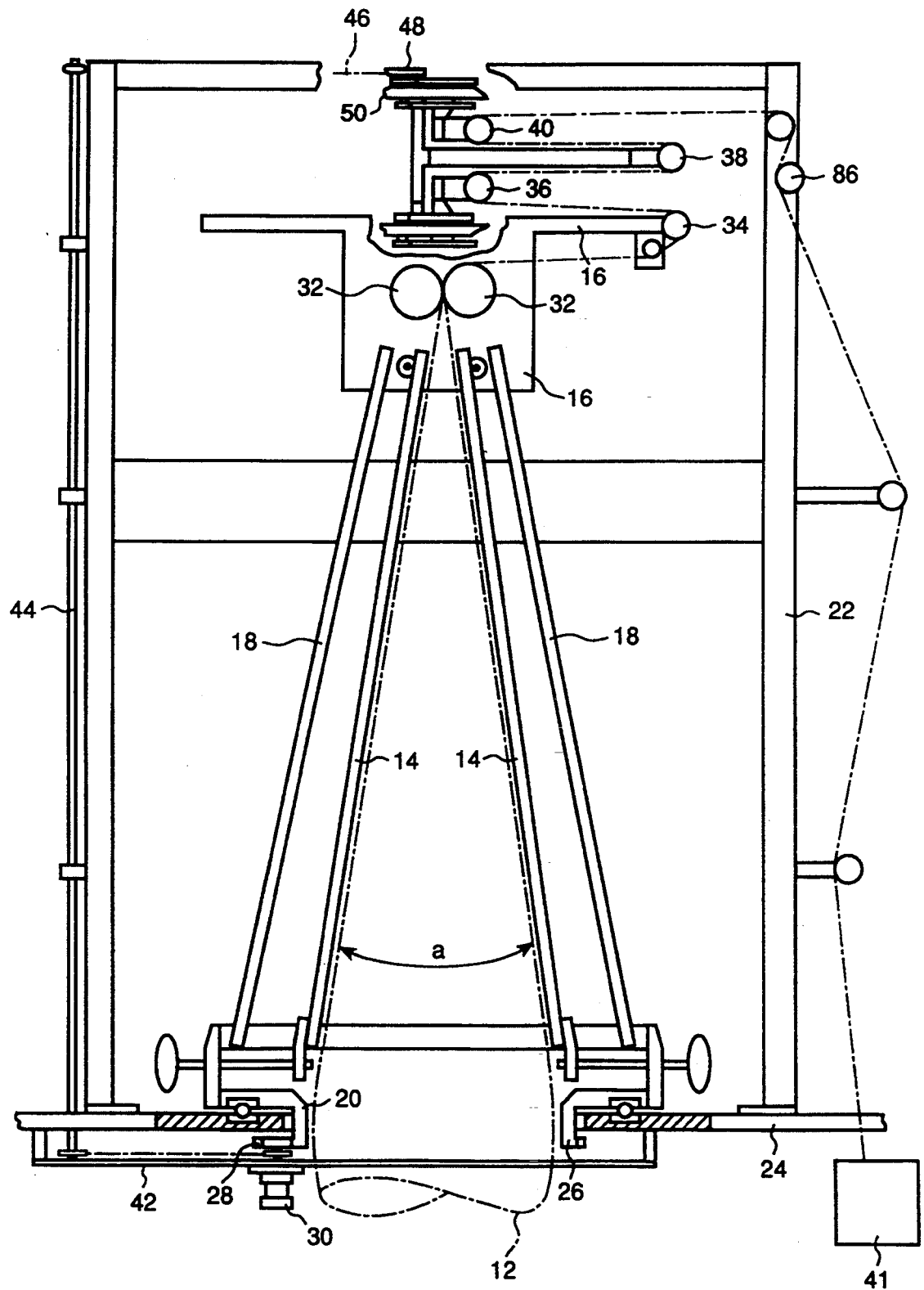
FIG. 1 is a schematic side view of an embodiment of the flattening and removing device according to the invention, in starting position (0° setting).

The invention will be described with reference to FIGS. 1 to 4, in which like numerals represent like parts.

A tubular film 12 formed by an extruder with a film blowing head (not shown) is flattened by flattening plates 14, which are swivel-mounted in mounting plates 16. The mounting plates 16 are connected by connecting struts 18 to a turntable 20, which is mounted for turning in the floor 24 of a frame 22.

The turntable 20 includes a gear rim 26 which engages with a pinion that is driven by a motor 30. The flattening plates 14 may be swung by means of a servo-mechanism in the directions shown by the double-headed arrow "a"(FIG. 1), so as to vary the angle enclosed thereby.

The mounting plates 16 which are rigidly connected to the turntable 20 also support squeezing rollers: 32 and a first deflecting roller 34 positioned behind the squeezing rollers 32.

The tubular film 12 is flattened by the squeezing rollers 32 and !s then guided by the deflecting roller 34, as shown in FIG. 1. The , tubular film is thereafter guided by a first turning bar 36, a second deflecting roller 38, and a second turning bar 40, before the flattened tubular film is conducted out of the frame 22 and fed to an additional treatment device, such as a stationary winding apparatus or secondary processing apparatus (not shown).

The squeezing rollers 32 and the first deflecting roller 34 are swung when the turntable 20 is made to turn by the motor-driven pinion 28. The motor 30 drives a shaft 44 mounted in frame 22 by means of drive chain 42. The turning motion is transmitted by a toothed belt 46 to a pulley 48. The pulley 48 is secured in turning fashion to a support 50, which is mounted to frame 22.

Figure 2:
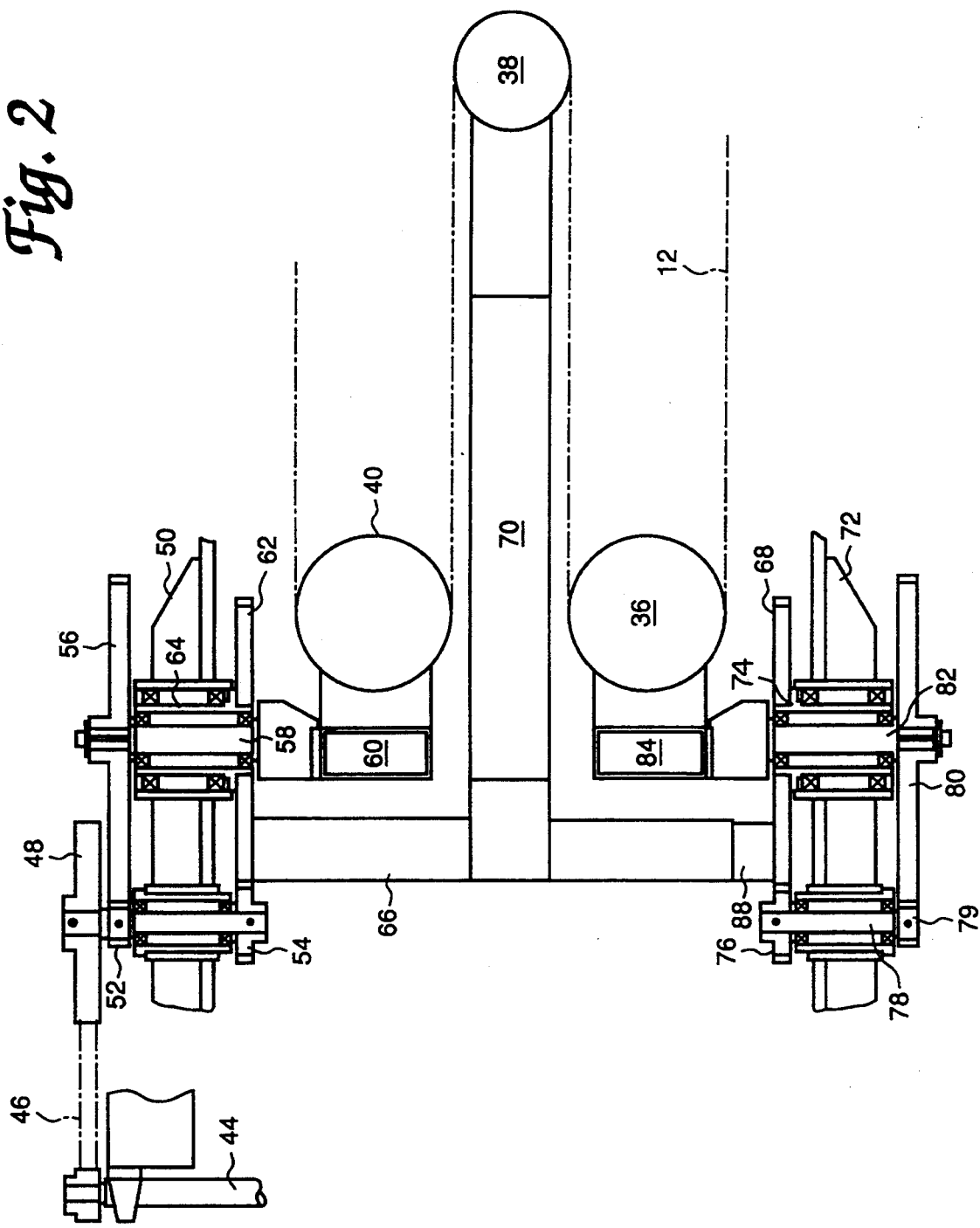
FIG. 2 is a detail of the embodiment of FIG. 1, shown in side view.

Positioned on the shaft of pulley 48 are two pinions 52 and 54, as shown in FIG. 2. The pinion 52 engages with a gearwheel 56, which is mounted in the support 50 by means of an axle 58. Connected in rigid fashion to the free end of this axle 58 is a support frame 60 for the second turning bar 40.

The pinion 54, which also is placed in turning motion by the pulley 48, engages with a gearwheel 62, which is mounted in turning fashion by means of a sleeve 64 in support 50. At the same time, the sleeve 64 encloses the above-described axle 58 in such a way that the axis of symmetry of the gearwheel 56 is aligned with the axis of symmetry of the gearwheel 62. The axle 58 of the gearwheel 56 thus extends through the sleeve 64 and projects on the side at which it is connected to the support frame 60 for the second turning bar 40.

Eccentrically positioned on the gearwheel 62 that is put into turning motion by the pinion 54 is a retainer 66, having a free end that is eccentrically connected in the same manner to a gearwheel 68. The gearwheel 68 is the same size as the gearwheel 62 and its axis of rotation is aligned in an imaginary line with the rotating axis of the gearwheel 62. Positioned on the retainer is a support frame 70 for the second deflecting roller 38, so that the support frame 70 for the second deflecting roller 38 can be horizontally swung by means of the gearwheel 62 and the attached retainer.

The swinging motion is transmitted to the gearwheel 68 by the retainer. The gearwheel 68 is seated on a sleeve 74 that is mounted in turning fashion in a support 72 that is rigidly connected to the mounting plates 16. Engaging with the gearwheel 68 is a pinion 76 that is mounted in the support 72 by means of an axle 78. The free end of the axle 78, which projects from the support 72 on the opposite side, bears a pinion 79 that engages with a gearwheel 80. The gearwheel 80 is mounted in the sleeve 74, already described, by means of an axle 82 and runs through the support 72 and the center of the gearwheel 68. At its free end the axle 82 is connected to a support frame 84 to which the first turning bar 36 is rigidly attached.

Figure 3:
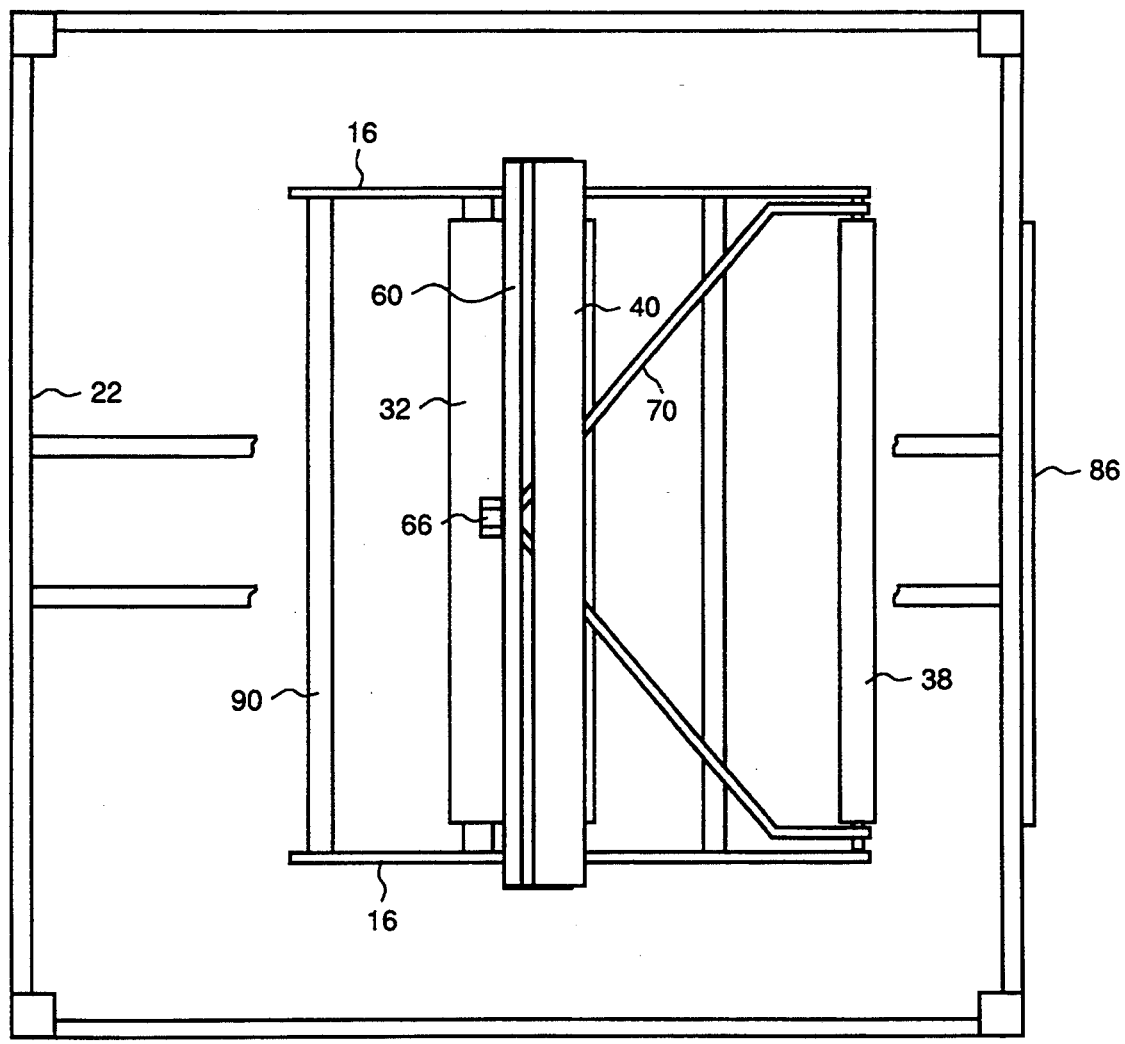
FIG. 3 is a simplified top view showing the position of the deflecting rollers and turning bars when the reversing device is in starting position (0° setting).

In FIG. 3 the already described reversing device is shown in zero position, i.e, the deflecting rollers 34 and 38 and the turning bars 36 and 40 are not displaced relative to each other. The mounting plates 16 are connected together by means of a corresponding connecting plate 90. At one rim of the frame 22, a deflecting roller 86 is shown by means of which the tubular film web 12 is led out of the frame, as shown in FIG. 1.

Figure 4:
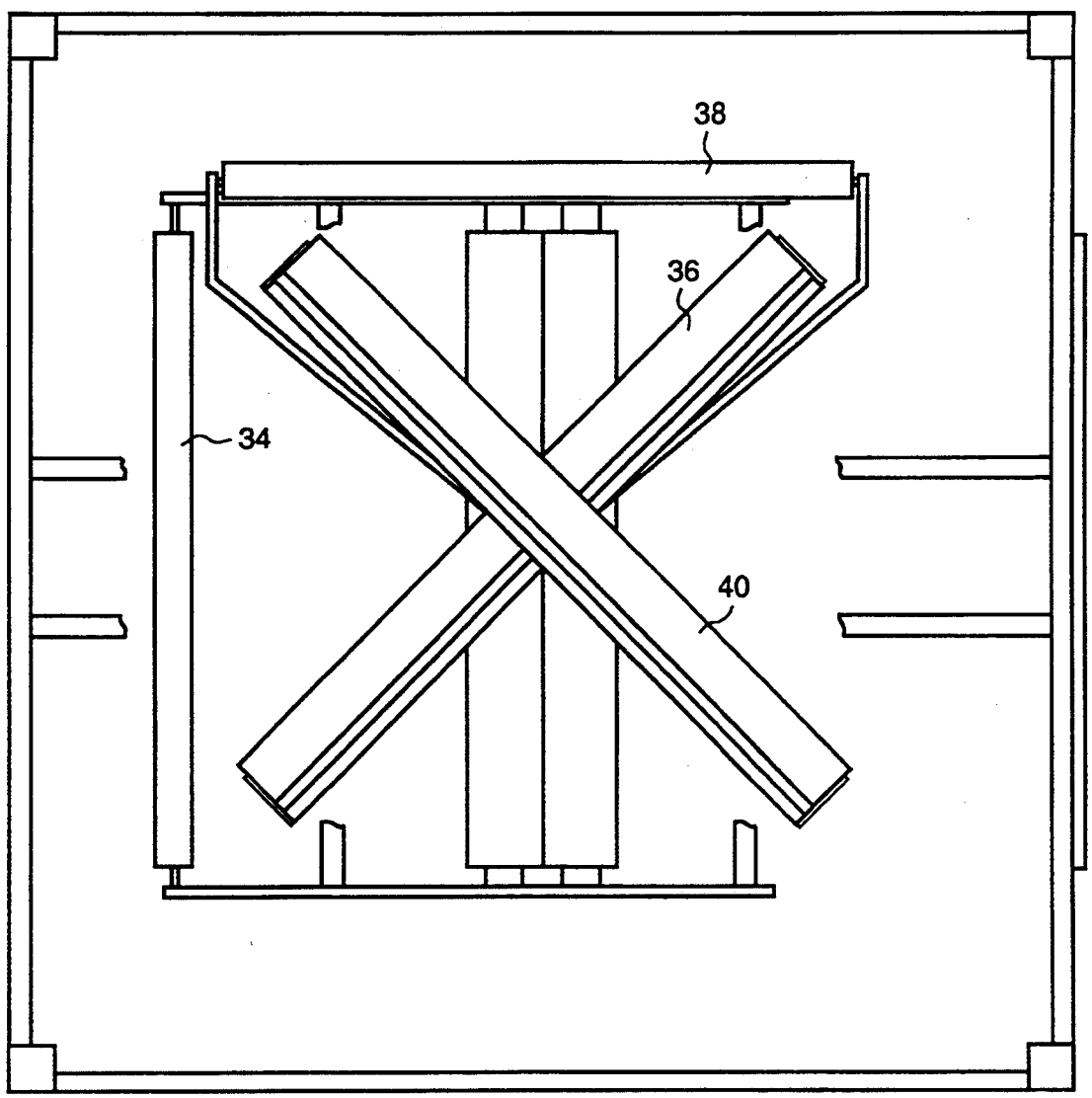
FIG. 4 is a top view corresponding to FIG. 3 in which the deflecting rollers and turning bars are turned counterclockwise.

FIG. 4 shows the reversing device in a position in which the first deflecting roller 34 is rotated by 180° in counterclockwise direction. The turning bar 36 is swung 135° in counterclockwise direction. The second deflecting roller 38 is swung 90° in counterclockwise direction and the second turning bar 40 is swung 45° in counterclockwise direction. The same positioning is also possible in clockwise direction, so that 360° reversal is possible with the reversing device described.

In keeping with the embodiment shown here, the retainer 66 positioned between the gearwheels 62 and 68 may partially consist of a part 88 which is rubber or another elastic material (cf. FIG. 3).

While the invention has been described above with respect to certain embodiments thereof, it will be appreciated by one skilled in the art that variations and modifications may be made without departing from the spirit and scope of the invention.

What is claimed is:

1. A flattening and removing device for a plastic tubular film produced by a stationary film blowing head in a blowing process, said device comprising:

flattening plates and squeezing rollers which are guided reversibly about an axis of a fed tubular film, a stationary treatment device mounted downstream of said squeezing rollers, and first and second radially outward reversing deflecting rollers and first and second radially inward turning bars, over which the tubular film is led between the squeezing rollers and the treatment device, wherein the deflecting rollers are each spaced from a respective rotating axis thereof at a greater distance than a distance of the turning bars from a swivel axis thereof and each said deflecting rollers is able to swing to every possible swinging position along its rotating axis without being impeded; and a) the first deflecting roller (34) and the squeezing rollers (32) are mounted parallel to each other between mounting plates (16), wherein the mounting plates are mounted rigidly to a turntable (20), said turntable being rotatably mounted in a frame floor (24), b) the second deflecting roller (38) is connected to a retainer (66) by way of a support frame (70), with ends of the retainer (66) being eccentrically connected to first and second gearwheels (62, 68), c) the first and second turning bars (36, 40) are respectively connected to third and fourth gearwheels (56, 80) by support frames (60, 84), d) center lines of each of the gearwheels (56, 62, 68, 80) are aligned with each other and with an imaginary swivel axis of the deflecting rollers (34, 38) and turning bars ( 36, 40), and e) the first gearwheel (62) of the second deflecting roller (38) and the fourth gearwheel (56) of the second turning bar (40) are each driven by a pinion (52, 54) arranged unrotatably on a shaft and the third gearwheel (80) of the first turning bar (36) meshes with a pinion (79) having a rotary movement which is transmitted by means of a pinion (76) of the second gearwheel (68) of the second deflecting roller (38).

2. A device according to claim 1, wherein the turntable mounted in turning fashion in the frame floor is set in turning motion by a motor-driven pinion.

3. A device according to claim 1, wherein the first gearwheel of the second deflecting roller and the fourth gearwheel of the second turning bar are each driven by pinions positioned on a shaft, and third gearwheel of the first turning bar engages with a pinion having a turning motion transmitted by a pinion of the second gearwheel of the second deflecting roller.

4. A device according to claim 1, wherein all turning motion is transmitted by a motor.

5. A device according to claim 1, wherein the flattening plates enclose an angle which is adjustable.

* * * * *